(12) United States Patent
Lagrut et al.

(10) Patent No.: US 11,560,123 B2
(45) Date of Patent: Jan. 24, 2023

(54) MOTOR VEHICLE COMPRISING A CAB BODY FIREWALL WITH A LOWER CROSSBEAM AND AN UPPER CROSSBEAM

(71) Applicant: Volvo Truck Corporation, Gothenburg (SE)

(72) Inventors: Jérôme Lagrut, Miribel (FR); Guillaume Rabouin, Ruy (FR)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/368,943

(22) Filed: Jul. 7, 2021

(65) Prior Publication Data
US 2022/0009449 A1 Jan. 13, 2022

(30) Foreign Application Priority Data
Jul. 10, 2020 (EP) .................................... 20185293

(51) Int. Cl.
*B60S 1/08* (2006.01)
*B60R 11/04* (2006.01)

(52) U.S. Cl.
CPC .............. *B60S 1/0844* (2013.01); *B60R 11/04* (2013.01)

(58) Field of Classification Search
CPC ...... B60S 1/0844; B60S 1/0874; B60R 11/04; B62D 25/14; B62D 33/06; B62D 25/08
See application file for complete search history.

(56) References Cited

U.S. PATENT DOCUMENTS

| | | |
|---|---|---|
| 9,545,954 B2 | 1/2017 | Dalmas et al. |
| 2001/0044865 A1 | 11/2001 | Croyle |
| 2009/0200835 A1 * | 8/2009 | Nilsson ................ B62D 25/145 296/190.08 |
| 2010/0225738 A1 * | 9/2010 | Webster .................. B60R 11/04 348/36 |

FOREIGN PATENT DOCUMENTS

| | | | |
|---|---|---|---|
| CN | 105000069 A | * 10/2015 | |
| EP | 0736445 A1 | * 10/1996 | ............. B62D 33/06 |
| EP | 2785576 B1 | 2/2016 | |
| EP | 3323699 A1 | 5/2018 | |
| EP | 3617040 A1 | 3/2020 | |

(Continued)

OTHER PUBLICATIONS

Extended European Search Report for European Patent Application No. 20185293.6, dated Jan. 20, 2021, 5 pages.

*Primary Examiner* — Michael Lee
(74) *Attorney, Agent, or Firm* — Withrow & Terranova, PLLC

(57) ABSTRACT

The invention relates to a motor vehicle comprising a cab comprising a dashboard, a windshield forming an upper front part of the cab and having a lower extremity, a driver assistance system comprising at least one sensor and a control unit, a cab body firewall forming a frame structure of a lower front part of the cab on which the dashboard is attached, the cab body firewall comprising a lower crossbeam holding the windshield by the lower extremity on an upper side of the lower crossbeam, and an upper crossbeam holding the at least one sensor and arranged above the upper side of the lower crossbeam, above the lower extremity of the windshield, and below the dashboard.

10 Claims, 4 Drawing Sheets

(56) References Cited

FOREIGN PATENT DOCUMENTS

| JP | 2006103669 A | * | 4/2006 | |
|---|---|---|---|---|
| SE | 1650608 A1 | * | 2/2017 | |
| WO | WO-2009095284 A1 | * | 8/2009 | ............. B61D 15/06 |
| WO | 2017030494 A1 | | 2/2017 | |
| WO | 2018215811 A1 | | 11/2018 | |
| WO | 2019111565 A1 | | 6/2019 | |

* cited by examiner

MOTOR VEHICLE COMPRISING A CAB BODY FIREWALL WITH A LOWER CROSSBEAM AND AN UPPER CROSSBEAM

RELATED APPLICATIONS

The present application claims priority to European Patent Application No. 20185293.6, filed on Jul. 10, 2020, and entitled "MOTOR VEHICLE COMPRISING A CAB BODY FIREWALL WITH A LOWER CROSS BEAM AND AN UPPER CROSS BEAM," which is incorporated herein by reference in its entirety.

TECHNICAL FIELD

The present invention relates to motor vehicles and, in particular, to motor vehicles comprising a cab body firewall having a lower crossbeam and an upper crossbeam.

BACKGROUND

More and more motor vehicles are equipped with driver assistance systems. A driver assistance system uses a plurality of sensors to detect parameters of an external environment of the vehicle. For example, the sensors can comprise a camera, a radar, a lidar, or a rain sensor, and the sensors can detect road panels, lanes, pedestrians, other vehicles on the road, or rain. The detected parameters are then processed by a control unit to assist the driver.

Nowadays, the sensors are positioned on the windshield of the vehicles. The sensors can either be positioned on the upper part of the windshield or on the lower part of the windshield.

However, the more the sensors are positioned high, the more the part of the external environment of the vehicle which is visible for the sensors is reduced. So, when the sensors are positioned on the upper part of the windshield, they are located too high with respect to the road on which the vehicle drives and the sensors cannot view a sufficient part of the external environment of the vehicle. For example, some road signs cannot be seen by the sensors.

And, when the sensors are positioned on the lower part of the windshield, even though it provides the sensors with a satisfactory visible part of the external environment of the vehicle, the sensors are positioned on the field of view of the driver, and thus, they create blind spots for the driver.

Hence, there is a need to find an optimal position for the sensors, which allows the sensors to have a satisfactory visible part of the external environment of the vehicle without creating blind spots for the driver.

SUMMARY

It is proposed a motor vehicle intended to be driven by a driver comprising:
- a cab configured to receive the driver inside and comprising a dashboard,
- a windshield forming an upper front part of the cab and having a lower extremity,
- a driver assistance system comprising at least one sensor configured to detect a parameter of an external environment of the vehicle and a control unit configured to process the parameter of the external environment of the vehicle,
- a cab body firewall forming a frame structure of a lower front part of the cab on which the dashboard is attached, the cab body firewall comprising:
  - a lower crossbeam holding the windshield by the lower extremity on an upper side of the lower crossbeam,
  - an upper crossbeam holding the at least one sensor, arranged above the upper side of the lower crossbeam and above the lower extremity of the windshield, and covered by the dashboard.

In the motor vehicle, according to the invention, the sensors are thus positioned on the cab body firewall. In particular, the cab body firewall comprises two crossbeams: the lower crossbeam and the upper crossbeam. This specific shape of the cab body firewall makes it possible to have the lower crossbeam to hold the windshield and to ensure the reinforcement of the structure of the vehicle, in particular in the event of a frontal collision, and to have the upper crossbeam dedicated to the holding of the sensors.

By being held by the upper crossbeam, the sensors are positioned facing the lower part of the windshield. This position allows maximizing the visible part of the external environment of the vehicle for the sensors. Therefore, the sensors have a satisfactory visible part of the external environment of the vehicle.

Besides, the upper crossbeam is covered by the dashboard. Hence, the driver of the vehicle cannot see the sensors since they are not positioned regarding a part of the windshield which is visible by the driver. Therefore, it avoids forming blind spots for the driver.

The following features can be optionally implemented, separately or in combination, one with the others.

According to one aspect, the windshield comprises an interior face directed toward the inside of the cab, the upper crossbeam being arranged on the side of the interior face of the windshield, and the sensor comprises a detection part facing the windshield, the sensor being configured to detect the parameter of the external environment through the windshield.

This way, the sensor is disposed behind the windshield when considering the normal direction of travel of the vehicle. The sensor is thus protected by the windshield, which allows avoiding any damage to the sensor. Besides, the detection of the parameter of the external environment of the vehicle can be done through the windshield.

According to one aspect, the motor vehicle comprises a wiping system attached to the cab body firewall and configured to clean a wiping area of the windshield, the detection part being arranged facing the wiping area of the windshield.

The wiping area of the windshield is easily washable and remains clean. Thus, good visibility of the external environment of the vehicle for the sensors is maintained, which ensures the efficiency of the detection of the sensors.

According to one aspect, the upper crossbeam forms a cavity opened towards the interior face of the windshield and closed by the windshield, and in which the sensor is positioned.

The cavity allows to easily position the sensor, and the closing of the cavity by the windshield allows enhancing the protection and the maintenance of the sensor.

According to one aspect, the cab body firewall extends transversally to the motor vehicle from a first transverse extremity of the motor vehicle to a second transverse extremity of the motor vehicle.

According to one aspect, among the at least one sensor, the driver assistance system comprises a front camera configured to capture an image of the external environment of the vehicle, and the driver assistance system is configured to assist the driver to detect an element on the external environment of the vehicle.

According to one aspect, among the at least one sensor, the driver assistance system comprises a rain sensor configured to detect rain in the external environment of the vehicle, the vehicle comprising wipers and the driver assistance system being configured to control the wipers of the vehicle depending on the detection of the rain sensor.

According to one aspect, the cab body firewall comprises a transverse wall positioned transversely to the vehicle, on which the upper crossbeam and the lower crossbeam are fixed.

According to one aspect, the cab body firewall comprises a transverse wall positioned transversely to the vehicle, on which the lower crossbeam is fixed, the upper crossbeam being attached on the upper side of the lower crossbeam.

According to one alternative, the transverse wall, the upper crossbeam, and the lower crossbeam are made of steel.

Hence, both the upper crossbeam and the lower crossbeam reinforce the structure of the vehicle.

According to another alternative, the transverse wall and the lower crossbeam are made of steel, and the upper crossbeam is made of plastic.

Hence, the lower crossbeam allows reinforcing the structure of the vehicle, and the weight of the cab body firewall is reduced.

BRIEF DESCRIPTION OF DRAWINGS

Other features, details, and advantages will be shown in the following detailed description and on the figures, on which.

DESCRIPTION OF EMBODIMENTS

In the figures, the same references denote identical or similar elements. For the sake of clarity, various elements may not be represented at scale.

In the description, the longitudinal direction L is defined as the direction from the rear to the front of the vehicle when considering the normal direction of travel of the vehicle, the transverse direction T is defined as the direction perpendicular to the longitudinal direction and from one side of the vehicle to the other, and the vertical direction V is defined from top to bottom, as the direction perpendicular to the longitudinal direction and the transverse direction.

Figure 1:
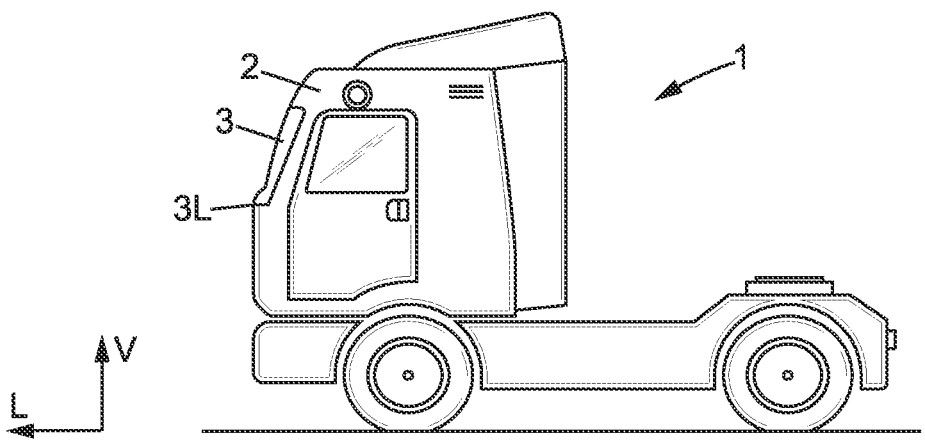
FIG. 1 illustrates a side view of a truck comprising a cab and a windshield.

FIG. 1 shows a truck 1 comprising a cab 2, which can receive a driver and a windshield 3. The windshield 3 forms an upper front part of the cab 2. The windshield 3 has a lower extremity 3L. Although the description presents a truck 1 as a motor vehicle, it is understood that the invention applies to any type of vehicle such as a car, a bus, or any other ground vehicle.

Figure 2:
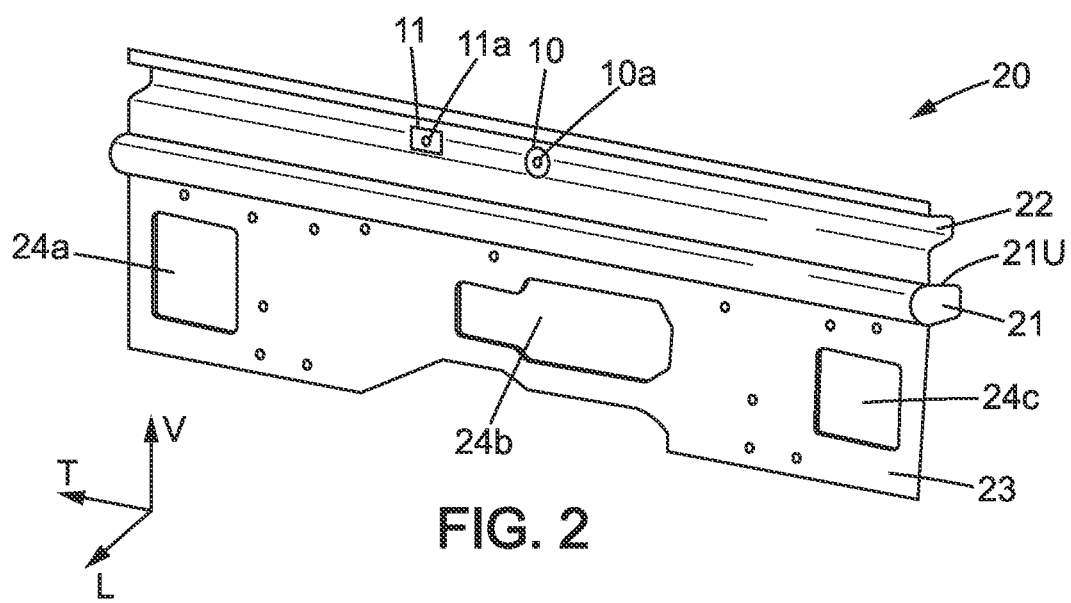
FIG. 2 illustrates a cab body firewall of the truck of FIG. 1.

The truck 1 also comprises a cab body firewall 20. The shape of the cab body firewall 20 is described with reference to FIG. 2. The cab body firewall 20 comprises a transverse wall 23. The cab body firewall 20 also comprises a lower crossbeam 21 comprising an upper side 21U fixed to the traverse wall 23. The lower crossbeam 21 allows reinforcing the structure of the cab body firewall 20 and thus reinforcing the structure of the truck 1. The lower crossbeam 21 prevents significant deformation of the front of the truck 1 in the event of a frontal collision.

The cab body firewall 20 also comprises an upper crossbeam 22. The upper crossbeam 22 is fixed to the traverse wall 23. The upper crossbeam 22 is arranged above the upper side 21U of the lower crossbeam 21. The upper crossbeam 22 forms a cavity.

In a non-represented alternative, the lower crossbeam 21 could be fixed to the traverse wall 23, and the upper crossbeam 22 could be attached on the upper side 21U of the lower crossbeam 21.

In a first alternative, the transverse wall 23, the upper crossbeam 22, and the lower crossbeam 21 are made of steel. This material allows reinforcing the structure of the truck 1. The lower crossbeam 21 and the upper crossbeam 22 are then welded on the transverse wall 23.

In a second alternative, the transverse wall 23 and the lower crossbeam 21 are made of steel to ensure the robustness of the cab body firewall 20, and the upper crossbeam is made of plastic to reduce the weight of the cab body firewall 20.

Figure 3:
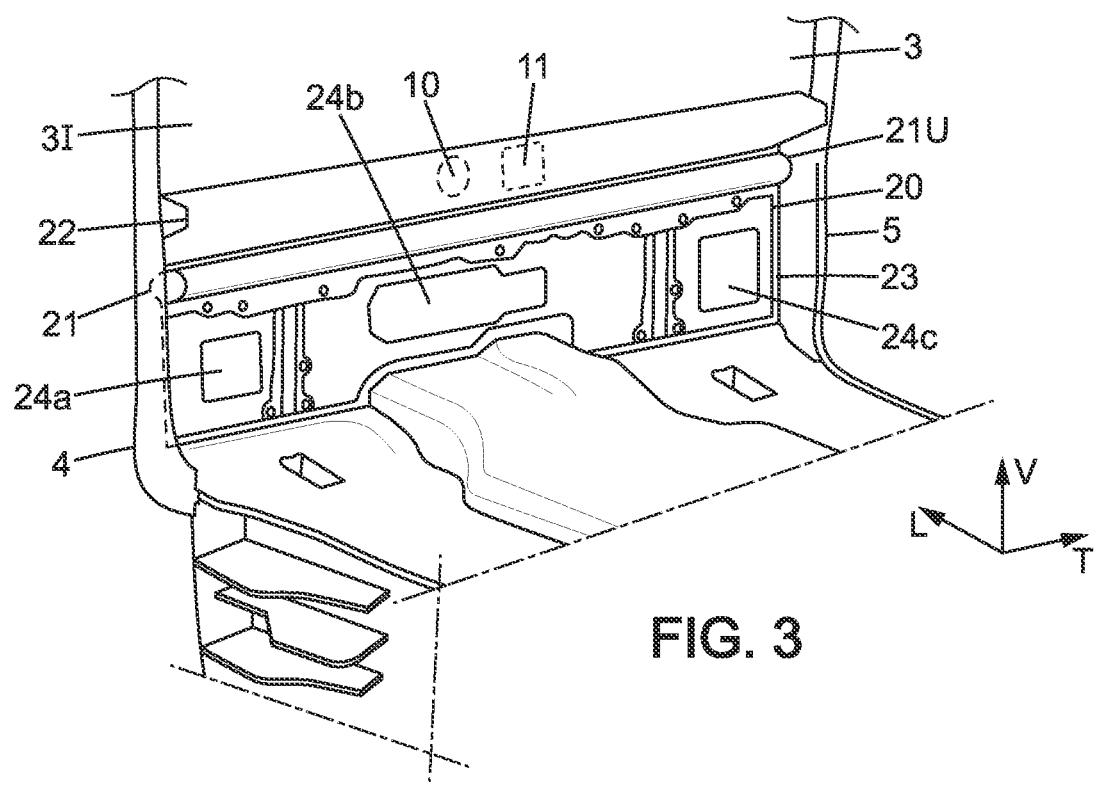
FIG. 3 illustrates a partial view of the inside of the truck of FIG. 2 showing the windshield and the cab body firewall.
Figure 4:
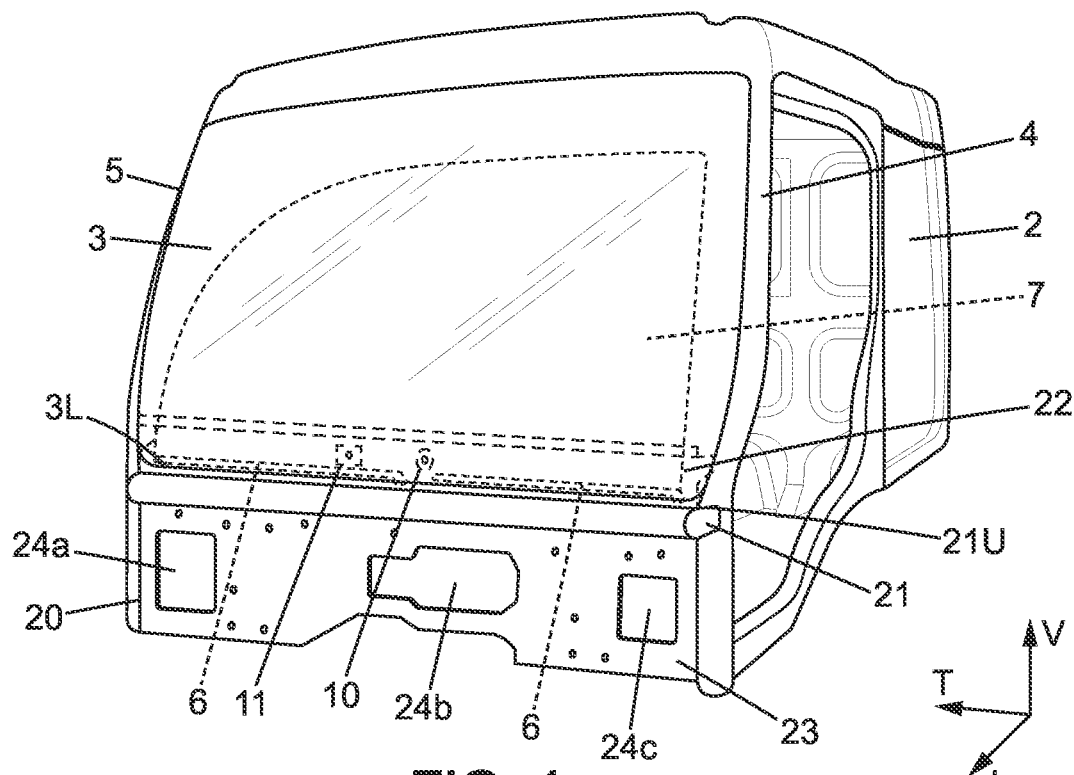
FIG. 4 illustrates a partial view of the outside of the truck of FIG. 2 showing the windshield and the cab body firewall.

As represented in FIG. 3 and FIG. 4, which respectively show a partial view of the inside of the truck 1 and a partial view of the outside of the truck 1, the cab body firewall 20 extends transversally to the truck 1 from a first transverse extremity of the truck to a second transverse extremity of the truck 1. The first transverse extremity is formed by a first vertical pillar 4, and the second transverse extremity is formed by a second vertical pillar 5. The transverse wall 23, the lower crossbeam 21, and the upper crossbeam 22 all extend transversally to the truck 1 from the first vertical pillar 4 to the second vertical pillar 5.

The upper side 21U of the lower crossbeam 21 holds the windshield 3 by its lower extremity 3L. The windshield 3 is bonded to the upper side 21U of the lower crossbeam 1. The upper crossbeam 22 is arranged above the lower extremity 3L of the windshield 3.

The windshield 3 comprises an interior face 31 directed toward the inside of the cab 2. The upper crossbeam 22 is arranged on the side of the interior face 31 of the windshield 3. The cavity of the upper crossbeam 22 is opened towards the interior face 31 of the windshield 3 and is closed by the windshield 3.

The cab body firewall 20 forms a frame structure of a lower front part of the cab 2. It comprises receiving openings 24a, 24b, 24c.

The truck 1 also comprises a driver assistance system having sensors such as a front camera 10 and a rain sensor 11, each detecting a parameter of an external environment of the truck 1. The front camera 10 is able to capture an image of the external environment of the truck 1. The rain sensor 11 is able to detect rain in the external environment of the truck 1.

The front camera 10 and the rain sensor 11 are disposed on the upper crossbeam 22. The sensors are thus disposed regarding the lower part of the windshield 3, which allows maximizing the visible part of the external environment of the vehicle for the sensors.

The front camera 10 and the rain sensor 11 are disposed on the cavity of the upper crossbeam 22. The front camera 10 comprises a detection part 10a facing the windshield 3. The rain sensor 11 comprising a detection part 11a facing the windshield 3. The rain sensor 11 and the front camera 10 can thus detect the parameter of the external environment through the windshield 3.

In that position, the sensors are protected by the cavity of the upper crossbeam 22 and by the windshield 3, which closes the cavity. It reduces the damages that can occur to the sensors, which increases the lifetime of these sensors.

The truck 1 also comprises a wiping system attached to the cab body firewall 20. The wiping system comprises two wipers 6 attached to the cab body firewall 20 to wash the windshield on a wiping area 7. The wiping area 7 of the windshield 3 is thus easily washable and remains clean.

The detection part 10a of the front camera 10 and the detection part 11a of the rain sensor 11 are arranged facing the wiping area 7 of the windshield 3. Therefore, the front camera 10 and the rain sensor 11 can keep good visibility of the external environment of the vehicle. The efficiency of the detection of the front camera 10 and the rain sensor 11 is maintained.

The driver assistance system could comprise other sensors such as a radar or a lidar, in addition to the front camera 10 and the rain sensor 11, or instead of the front camera 10 or the rain sensor 11 or both. The radar or the lidar would be able to measure the speed of an element in the external environment of the truck 1.

The driver assistance system also comprises a control unit 15 to process the parameter of the external environment of the truck 1. For example, from the image of the external environment of the truck 1 captured by the front camera 10, the control unit 15 can identify elements present in the external environment of the truck 1, such as road panels, lanes, pedestrians, or other vehicles on the road. These identified elements can then be displayed on a screen 33 positioned in the truck 1. These identified elements are thus enhanced for the driver. The driver assistance system assists the driver in detecting these elements of the external environment of the truck.

In another example, the control unit 15 can control the wipers 6 of the truck 1 depending on the detection done by the rain sensor 11. In particular, when the rain sensor 11 detects rain in the external environment of the truck 1, the control unit 15 can activate the wipers 6, and when the rain sensor 11 detects that it is not raining anymore, the control unit 15 can deactivate the wipers 6.

Figure 5:
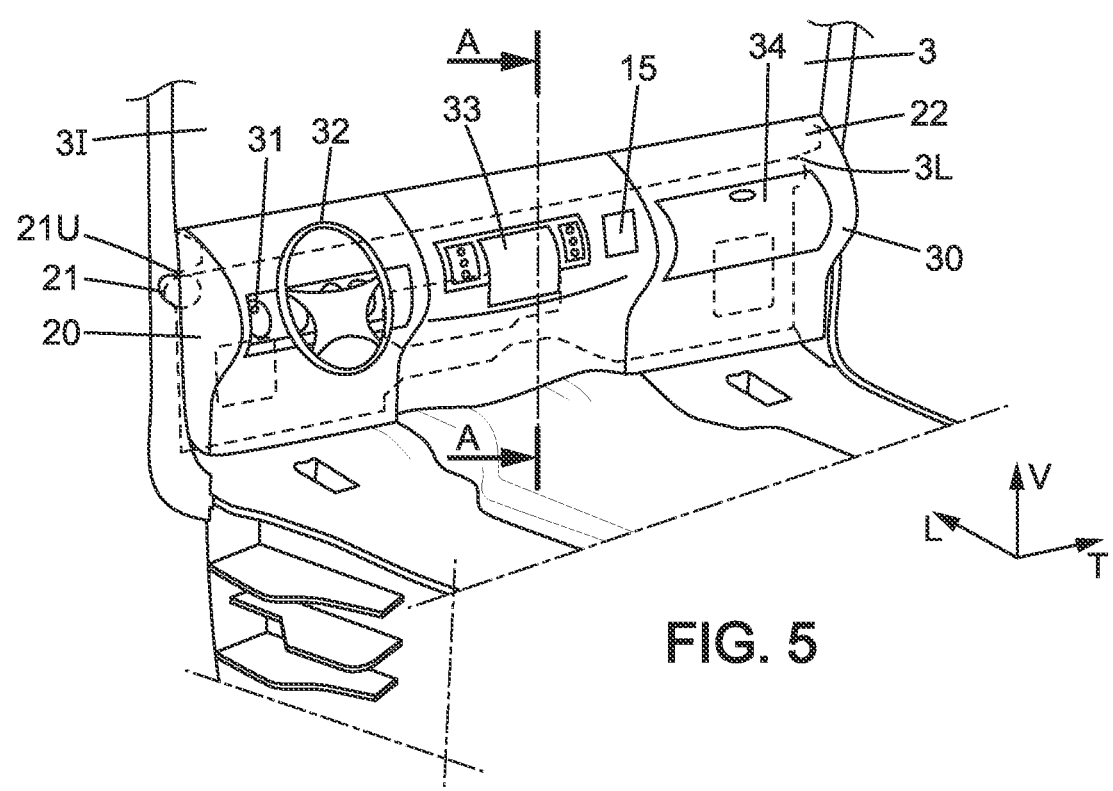
FIG. 5 illustrates the partial view of the inside of the truck of FIG. 2, in which a dashboard has been represented.

Additionally, as shown in FIG. 5, the cab 2 comprises a dashboard 30. The dashboard 30 comprises a plurality of elements such as a steering wheel 32, the control unit 15, a speed display 31, the screen 33 for displaying the elements identified by the control unit 15 on the image captured by the front camera 10, and a glove compartment 34. This list of elements is not exhaustive. The dashboard 30 may include only some of these elements. It could still include other elements that are not listed.

The dashboard 30 is fixed to the cab body firewall 20. The receiving openings 24a, 24b, 24c of the cab body firewall 20 are arranged to receive the plurality of elements of the dashboard 30.

The upper crossbeam 22 is covered by the dashboard 30. The dashboard 30 is arranged between the cab body firewall 20 and a driving position of the driver in the longitudinal direction L.

The dashboard 30 is hiding the upper crossbeam 22 for the driver of the truck 1 when he is in the driving position. Hence, neither the upper crossbeam 22 nor the sensors disposed on the upper crossbeam 22 are visible for the driver of the truck 1. The sensors do not create any blind spots for the driver.

Figure 6:
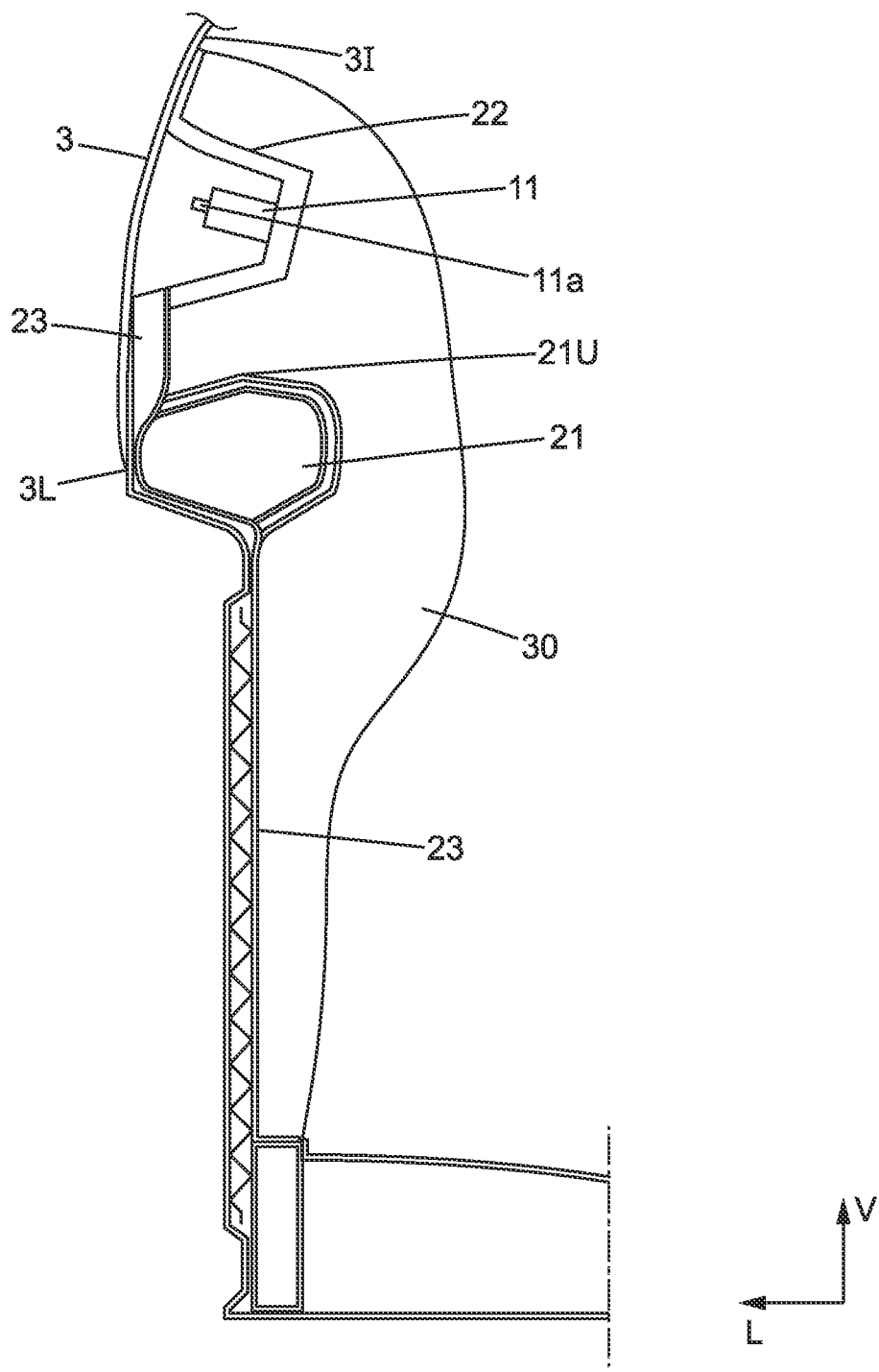
FIG. 6 is a cross-sectional view of the truck along the A-A axis of FIG. 5.

The layout of the cab body firewall 20, the windshield 3, and the dashboard 30 is particularly visible in FIG. 6, which shows a cross-sectional view of the truck 1 along the A-A axis of FIG. 5.

As previously described, this cross-section view shows the lower crossbeam 21 and the upper crossbeam 22 are fixed to the transverse wall 23. The upper crossbeam 22 is arranged above the upper side 21U of the lower crossbeam 21. The lower crossbeam 21 holds the windshield 3 by its lower extremity 3L, and the windshield 3 is arranged in front of the upper crossbeam 22. The upper crossbeam 22 holds the sensors of the driver assistance system. The rain sensor 11 is, in particular, visible in FIG. 4. Its detection part 11a is oriented towards the windshield 3. The dashboard 30 is arranged against the cab body firewall 20 and covers the upper crossbeam 22.

The invention claimed is:

1. A motor vehicle comprising:
a cab comprising a dashboard,
a windshield forming an upper front part of the cab and having a lower extremity,
a driver assistance system comprising at least one sensor configured to detect a parameter of an external environment of the vehicle and a control unit configured to process the parameter of the external environment of the vehicle,
a cab body firewall forming a frame structure of a lower front part of the cab on which the dashboard is attached, the cab body firewall comprising:
a lower crossbeam holding the windshield by the lower extremity on an upper side of the lower crossbeam, and
an upper crossbeam holding the at least one sensor, arranged above the upper side of the lower crossbeam and above the lower extremity of the windshield, and covered by the dashboard,
wherein the windshield comprises an interior face directed toward the inside of the cab, the upper crossbeam being arranged on the side of the interior face of the windshield, and wherein the upper crossbeam forms a cavity opened towards the interior face of the windshield and closed by the windshield, and in which the sensor is positioned.

2. The motor vehicle of claim 1, wherein the sensor comprises a detection part facing the windshield, the sensor being configured to detect the parameter of the external environment through the windshield.

3. The motor vehicle of claim 2, comprising a wiping system attached to the cab body firewall and configured to clean a wiping area of the windshield, the detection part being arranged facing the wiping area of the windshield.

4. The motor vehicle of claim 1, wherein the cab body firewall extends transversally to the motor vehicle from a first transverse extremity of the motor vehicle to a second transverse extremity of the motor vehicle.

5. The motor vehicle of claim 1, wherein, among the at least one sensor, the driver assistance system comprises a front camera configured to capture an image of the external environment of the vehicle, and the driver assistance system is configured to assist the driver to detect an element in the external environment of the vehicle.

6. The motor vehicle of claim 1, wherein, among the at least one sensor, the driver assistance system comprises a rain sensor configured to detect rain in the external environment of the vehicle, the vehicle comprising wipers and the driver assistance system being configured to control the wipers of the vehicle depending on the detection of the rain sensor.

7. The motor vehicle of claim 1, wherein the cab body firewall comprises a transverse wall positioned transversely to the vehicle, on which the upper crossbeam and the lower crossbeam are fixed.

8. The motor vehicle of claim 1, wherein the cab body firewall comprises a transverse wall positioned transversely to the vehicle, on which the lower crossbeam is fixed, the upper crossbeam being attached on the upper side of the lower crossbeam.

9. The motor vehicle of claim 7, wherein the transverse wall, the upper crossbeam, and the lower crossbeam are made of steel.

10. The motor vehicle of claim 7, wherein the transverse wall and the lower crossbeam are made of steel, and the upper crossbeam is made of plastic.

* * * * *